July 21, 1970   J. K. KELLEY ET AL   3,521,136
CONTROL SYSTEM FOR CONTROLLING SPEED AND DIRECTION OF ROTATION
OF TWO MOTORS WITH A SINGLE MAIN CONTROL MEMBER
Filed April 12, 1967   3 Sheets-Sheet 1
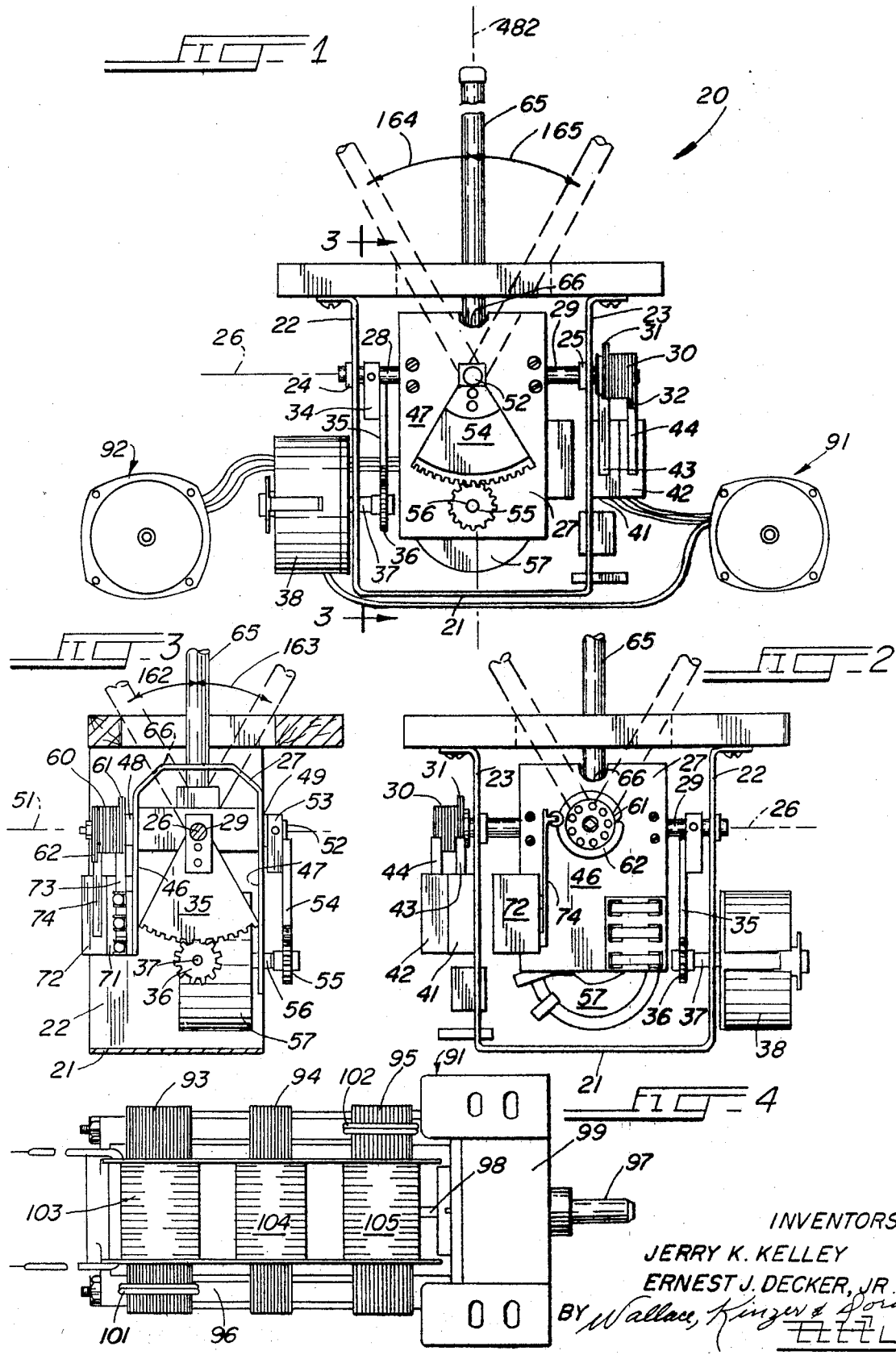
INVENTORS.
JERRY K. KELLEY
ERNEST J. DECKER, JR.
BY Wallace, Kinzer & Dorn

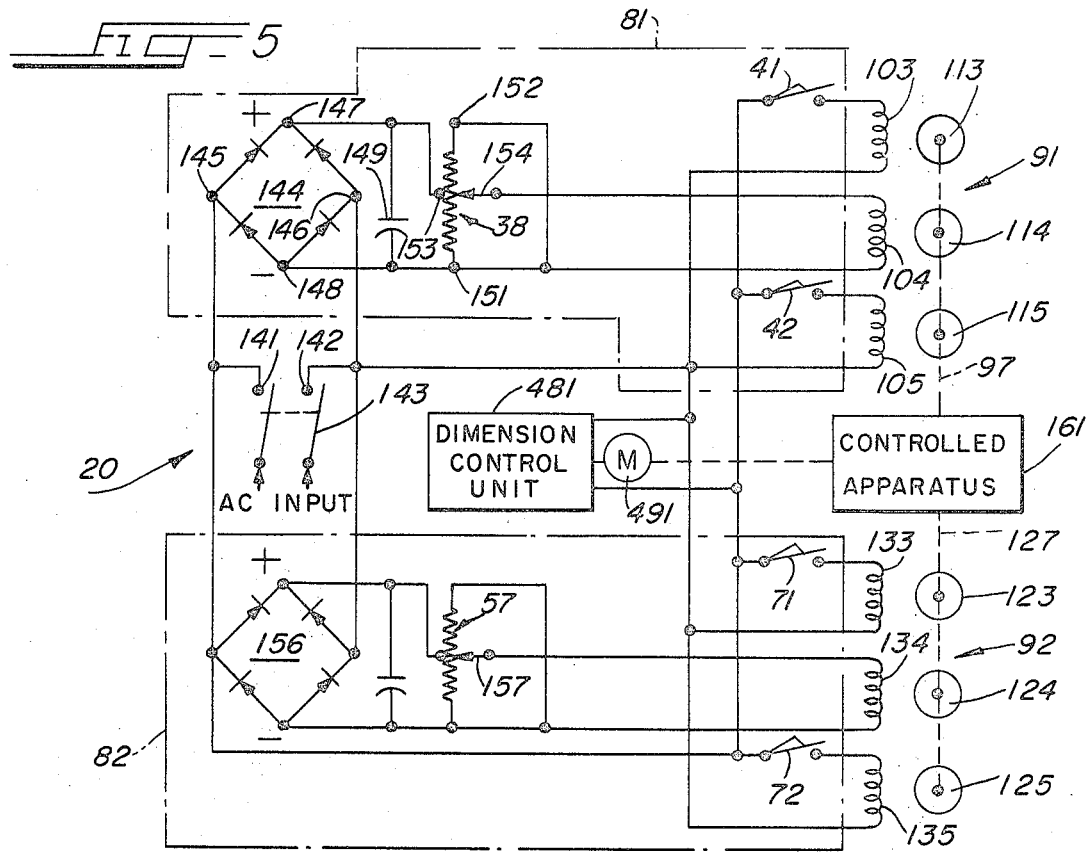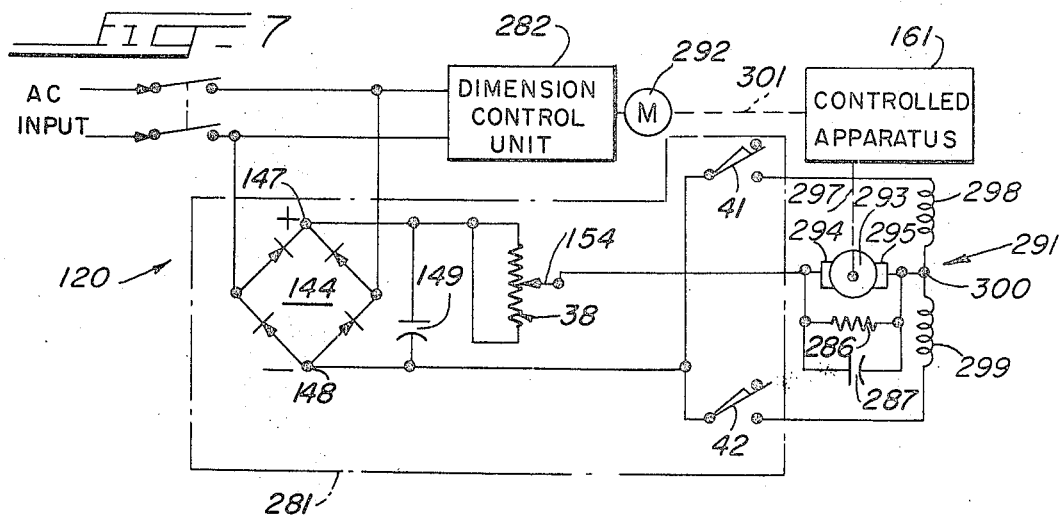

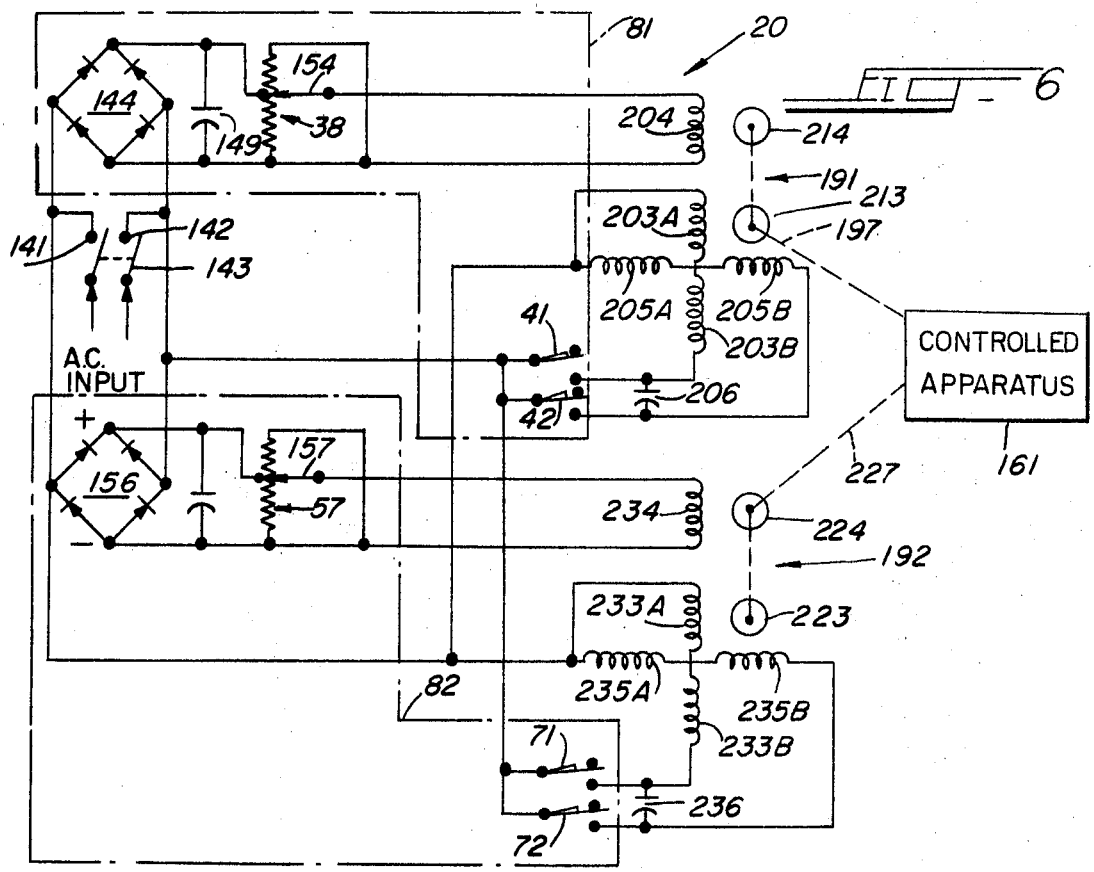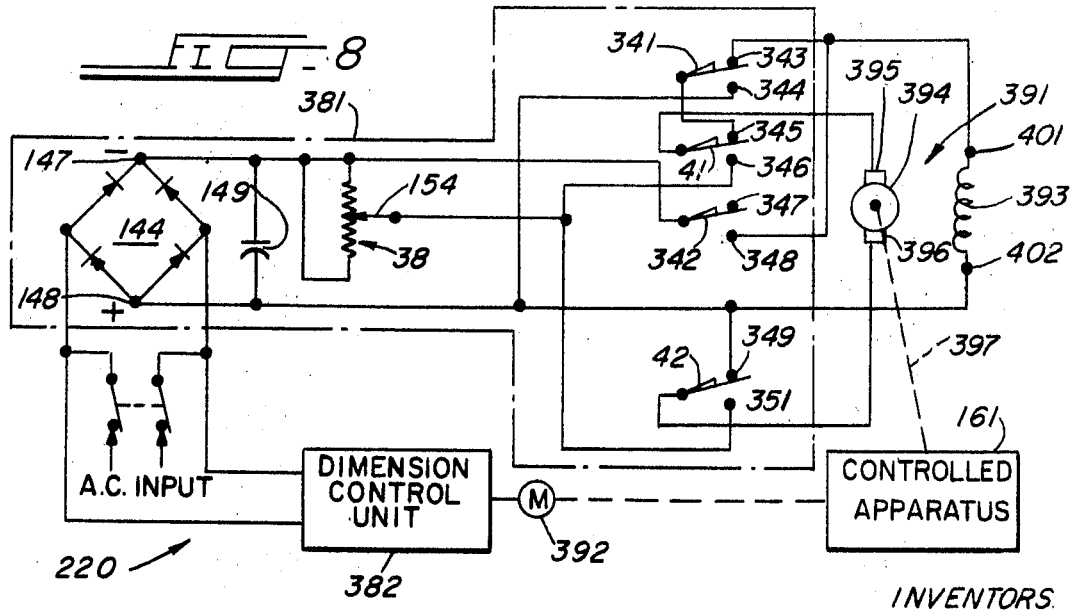

United States Patent Office
3,521,136
Patented July 21, 1970

3,521,136
CONTROL SYSTEM FOR CONTROLLING SPEED AND DIRECTION OF ROTATION OF TWO MOTORS WITH A SINGLE MAIN CONTROL MEMBER
Jerry K. Kelley, 3121 N. Nottingham, Chicago, Ill. 60634, and Ernest J. Decker, Jr., Carpentersville, Ill.; said Decker Jr. assignor to said Kelley
Filed Apr. 12, 1967, Ser. No. 630,350
Int. Cl. H02p 7/74
U.S. Cl. 318—38                                  4 Claims

ABSTRACT OF THE DISCLOSURE

A control system for varying both the speed and the direction of rotation of two electric motors in response to pivotal movement of a single main control member, from a given home position, about first and second transversely aligned axes. There are two dimension control units in the system; each includes a direction control device comprising a pair of cam-actuated switches electrically connected to one of the reversible electric motors to energize that motor to rotate in a given direction depending upon the direction of movement of the main control member away from its home position about one particular axis. Each dimension control unit further includes a rheostat speed control device that is electrically connected to the same motor and varies the speed of the motor in accordance with the amplitude of pivotal movement of the main control member about the same axis. The motors in some embodiments are of special construction, being provided with electrically energized dynamic brakes to limit the rotational speeds of the motors. Other embodiments use conventional electric motors, the basic electrical construction for the dimension control units being essentially the same in all embodiments. Additional dimension control units controlled from the same main control member are added in accordance with the requirements of the controlled apparatus.

BACKGROUND OF THE INVENTION

Field of the invention

This invention relates to a new and improved control system for controlling virtually any form of apparatus that is movable in at least two coordinate directions in response to actuation of a corresponding number of reversible electric motors. For example, the control system may be applied to flight trainers, automotive driving trainers, machine tools, games, optical instruments, visual and physical therapy devices, material handling devices, and a wide variety of other forms of apparatus that is electrically driven for at least two-coordinate movement. The control system connects the electric motors of the driven apparatus to a single main control member which may be moved by the operator, virtually omnidirectionally, to energize the motors at varying speeds and in varying combinations of directions to produce any desired movement on the part of the controlled apparatus.

For example, consider an aircraft gunnery game in which the controlled apparatus is a simulated rapid-fire weapon mounted for both vertical pivotal movement and horizontal pivotal movement, the two movements being controlled by individual electric motors. The control system of the present invention provides a single unified control for the two electric motors required to drive the game, complete control being exercised by the movements of a single control "stick" or like member. The control member can be pivoted forwardly and backwardly by the player to raise and lower the simulated automatic weapon and can be pivoted left and right to swing the simulated weapon horizontally. The control member of the system need not be moved along or parallel to any given axes, but can be deflected by the operator along any given vector to produce a corresponding vector movement of the game piece.

The same control system can be applied, without substantial modification, in a machine tool. Thus, in a lathe, the two motors controlled by the main control member may be utilized to position the cutting tool of the lathe longitudinally of a workpiece and to advance and retract the cutting tool relative to the workpiece. Movement of the cutting tool along a diagonal of either linear or curved nature is readily achieved by appropriate and corresponding movement of the control member. In any application, the controlled apparatus is maintained at any given position simply by moving the control member back to its "home" position; preferably, dynamic braking is utilized for positive assurance of retention of the controlled apparatus at any desired position.

The prior art

The control of two electrical motors from a single lever, particularly with respect to speed of rotation, has been accomplished in a number of different instances in the prior art, including particularly the apparatus shown in Mercier Pat. No. 2,422,117 and Kutzler et al. Pat. No. 2,471,821, both directed to aircraft controls. In most instances, the prior art devices do not afford direct and positive control of the direction of rotation of reversible motors, from a single control lever or like control member. Moreover, devices of this kind as disclosed in the prior art tend to be quite complex in their electrical circuitry and in the mechanical arrangements linking the main control member to the electrical motors. Another example of this general kind of control is Aske Pat. No. 2,470,968.

The prior art also includes numerous examples of mechanical controls for controlling the movements of objects in two or more coordinate directions by direct mechanical connection from a single control stick or like control member to the moving objects. Typical examples of mechanical devices of this nature are shown in Christiansen Pat. No. 2,067,828 and Hamilton Pat. No. 2,650,827. In mechanical devices of this kind, however, a separate power source is provided for the controlled object; the systems are not readily adaptable to actuation of electric motors that themselves power the controlled object.

SUMMARY OF THE INVENTION

It is a principal object of the present invention to provide a new and improved control system for controlling both the direction and speed of rotation of various types of electric motors, from a single main control member, utilizing a simple basic control system without substantial modification for different motor types.

A more specific object of the invention is to provide a new and improved control system for controlling an apparatus movable in first and second coordinate directions according to the actuation of two reversible electric motors, in which complete control is exercised by pivotal movement of a single control stick or like control member, with the operator being able to move the control stick directly along any path corresponding to the path required for movement of the controlled apparatus.

Another object of the invention is a new and improved coordinate control system for reversible electric motors in which two, three, or more dimensions of movement can be controlled from a single main control member, such as a pivotal lever, by apparatus that is simple and inexpensive in construction yet reliable in operation.

An additional object of the invention is to provide positive control for maintaining a controlled apparatus in a given position subsequent to movement of the apparatus to that position, where control is exercised through a single main control member that actuates at least two individual reversible electric motors that drive the apparatus.

A control system for controlling an apparatus movable in first and second coordinate directions in response to actuation of first and second reversible electric motors, constructed in accordance with the invention, comprises a main control member and mounting means for mounting that member for simultaneous pivotal movement, from a given home position, about first and second transversely aligned axes. The control system further includes first and second dimension control units, each of which includes a direction control device for selectively energizing a reversible electric motor for rotation in opposite directions and a speed control device for varying the speed of an electric motor. Both control devices in each control unit are electrically connected to a respective one of the electric motors. Means are provided for mechanically connecting the direction control device of each control unit to the main control member to actuate the direction control device and to energize its motor for rotation in a given direction in response to pivotal movement of the main control member, from its home position, about one axis. Further, means are provided for mechanically connecting the speed control device of each dimension control unit to the main control member to actuate that speed control device and vary the speed of its motor in accordance with the amplitude of pivotal movement of the control member, from its home position, about the same axis.

DESCRIPTION OF THE DRAWINGS

FIG. 1 is a front elevation view of a control system constructed in accordance with the present invention;

FIG. 2 is a rear elevation view of the apparatus of FIG. 1;

FIG. 3 is a side elevation view, partially cut away, of the control system of FIGS. 1 and 2;

FIG. 4 is a plan view of one of the motors controlled by the control system of FIGS. 1 and 2;

FIG. 5 is a schematic diagram of the electrical circuit for the control system of FIGS. 1–4;

FIG. 6 is a schematic diagram of an electrical control circuit for a modified form of the invention employed in connection with a different form of motor;

FIG. 7 is a simplified schematic diagram of another embodiment of electrical circuit for use with another form of motor;

FIG. 8 is a simplified schematic diagram of an electrical circuit for utilizing the control system of the invention with yet another form of motor.

DESCRIPTION OF THE PREFERRED EMBODIMENTS

The mechanical construction of a first control system 20, constructed in accordance with the invention, is illustrated in FIGS. 1–3. The motor construction employed in this embodiment of the invention is shown in FIGS. 1 and 4. The electrical control circuit for system 20 is illustrated in FIG. 5.

Control system 20, in the mechanical construction illustrated in FIGS. 1–3, comprises a substantially U-shaped frame 21 having two spaced vertically extending frame members 22 and 23. A pair of bearings 24 and 25 are mounted in the vertical frame members 22 and 23, in alignment with each other along a first axis 26. A saddle bracket shaft 28 is journalled in bearing 24; shaft 28 is a cantilever shaft projecting inwardly of frame 21 with the free end of the shaft affixed to an inverted U-shaped saddle bracket 27. A second similar shaft 29 is journalled in bearing 25 and projects inwardly of frame 21, where it is secured to bracket 27. Shaft 29 also projects outwardly of its vertical frame member 23, a double cam member 30 having two cam surfaces 31 and 32 being affixed to the outer end of the shaft for rotation therewith.

A pair of cam actuated switches 41 and 42 are mounted upon the external surface of frame member 23 below cam member 30. Switch 41 is provided with a cam follower arm 43 that projects upwardly into engagement with cam surface 31 on cam member 30. Similarly, switch 42 has a cam follower arm 44 that engages cam surface 32 of member 30. Switches 41 and 42 are a part of a direction control device as described more fully hereinafter, particularly in conjunction with FIG. 5.

A collar 34 is affixed to saddle bracket shaft 28, intermediate frame member 22 and bracket 27. A crescent gear 35 is affixed to collar 34 for pivotal movement in response to rotation of shaft 28. The crescent gear is disposed in meshing engagement with a pinion gear 36 that is mounted upon the shaft 37 of a rheostat 38, the rheostat being mounted upon vertical frame member 22. Rheostat 38 is a part of a speed control device that is incorporated in a first dimension control unit 81 (see FIG. 5) together with switches 41 and 42.

As shown in FIG. 3, saddle bracket 27 comprises two vertically depending support members 46 and 47. A pair of bearing members 48 and 49 are mounted in support members 46 and 47, respectively, in alignment with each other and with a second horizontal axis 51. Axis 51 is coplanar with axis 26, a relationship that is preferred for accuracy in operation of the control system but that need not be maintained absolutely. A shaft 52 extends transversely of saddle bracket 27, being journalled in the two bearings 48 and 49 and projecting outwardly of the saddle bracket beyond each of the support members 46 and 47.

A collar 53 is affixed to one end of shaft 52, adjacent bearing 49, and a crescent gear 54 is affixed to collar 53 for pivotal movement in response to rotation of shaft 52. Crescent gear 54 is in meshing engagement with a pinion gear 55 mounted upon the shaft 56 of a second rheostat 57. Rheostat 57 is the principal operating component of a second speed control device described more fully hereinafter.

At the opposite side of the mechanism from crescent gear 54, a second cam member 60 is mounted upon shaft 52 for rotational movement with the shaft. Cam member 60 includes two spaced cam surfaces 61 and 62. Two cam actuated switches 71 and 72 are mounted upon the vertically extending support member 46 of bracket 27 below cam member 60. Switch 71 includes an upwardly extending cam follower arm 73 that engages cam surface 61, whereas switch 72 has an upwardly extending cam follower arm 74 that engages cam surface 62. The two cam actuated switches 71 and 72 constitute the principal operating components of a second direction control device that is incorporated in a second dimension control unit 82 (FIG. 5) with the rheostat 57.

Control system 20, as shown in FIGS. 1–3, further includes a single main control member 65. Control member 65, which constitutes a control stick or handle through which all operations of the control system are effected, is affixed to shaft 52 in alignment with the center of saddle bracket 27. The opening 66 in the top horizontal portion of the bracket, through which the handle projects, is of elongated configuration in a direction parallel to axis 51. Thus, the side walls of the opening 66 in the bracket are close enough to handle 65 to preclude pivotal movement of the handle from left to right, as seen in FIG. 3, without corresponding movement of bracket 27. Stated differently, any angular displacement of handle 65 about axis 26 produces a corresponding pivotal movement of the saddle bracket and of shafts 28 and 29. But pivotal movement of handle 65 from left to right as seen in FIG. 1 does not cause the saddle bracket to pivot on its axis; but results only in rotational movement of the shaft 52 on which the handle is mounted.

Control system 20 controls two motors 91 and 92. These two motors are of similar construction; motor 91 is shown in substantial detail in FIG. 4.

Motor 91, as illustrated in FIG. 4, comprises three stator cores 93, 94 and 95 mounted on a common frame 96 in alignment with each other. Frame 96 is provided with suitable bearings for supporting a single shaft 98 that extends through each of the cores 93–95. Shaft 98 drives a speed-reducing gear 99 having an output shaft 97. Cores 93, 94 and 95 are provided with individual electrical windings 103, 104 and 105, respectively.

Core 93 is also provided with an auxiliary shorted winding 101. A rotor 113, not visible in FIG. 4 is mounted on shaft 98 in alignment with core 93; see FIG. 5. Rotor 113, together with core 93 and windings 101 and 103, forms a conventional single phase AC motor of the shaded pole type.

Similarly, core 95 is provided with a shorted winding 102 and is aligned with a second rotor 115, not visible in FIG. 4, mounted upon shaft 98. Rotor 115 (FIG. 5), together with core 95 and windings 102 and 105, affords a second shaded pole motor unit on shaft 98. However, as will be apparent from the positions of windings 101 and 102, FIG. 4, the two shaded pole motor units comprising cores 93 and 95 are constructed for rotation in opposite directions. Thus, the motor unit comprising core 93 and coil 103 is constructed to rotate the output shaft 97 in a clockwise direction when energized, whereas the shaded pole motor unit comprising core 95 and coil 105, when energized, rotates the output shaft in a counterclockwise direction.

Core 94, although constructed of laminations similar to those used in cores 93 and 95, is not incorporated in a motor unit for driving the motor shafts. There is no shaded pole winding on core 94. However, there is a rotor 114 mounted upon the motor shaft within the confines of core 94 (FIG. 5). Consequently, energization of coil 104, establishing a magnetic field that links the rotor at the center of the shaft, resists rotational movement of the shaft. It is thus seen that core 94 and coil 104, in conjunction with rotor 114, afford a positive dynamic brake for motor 91.

As noted above, motor 92 is similar in construction to motor 91. It includes three rotors 123, 124 and 125 driving common output shaft 127 (FIG. 5). The three rotors are disposed within the magnetic fields established by three main windings 133, 134 and 135. In motor 92, winding 133 and rotor 123 are incorporated in a shaded pole motor construction which rotates shaft 127 in a clockwise direction. Rotor 125 and winding 135 are part of a shaded pole motor unit that rotates shaft 127 counterclockwise. Rotor 124 and winding 134, on the other hand, comprise a dynamic brake.

Motor 91 is controlled by the first dimension control unit 81 of control system 20. Directional control of the motor is achieved by means of the cam-actuated switches 41 and 42. Speed control is accomplished by rheostat 38.

One terminal of motor winding 103 is connected to a normally open contact of cam-actuated switch 41. The movable contact of switch 41 is connected to one terminal 141 of an AC supply. The other terminal of winding 103 is returned directly to the second terminal 142 of the AC supply, which may be provided with an appropriate master switch 143.

The connections for winding 105 are similar to those for winding 103. Thus, one terminal of winding 105 is connected through the normally open contact of switch 42 to one terminal 141 of the AC supply. The other terminal of the motor winding is returned to the AC terminal 142.

The speed control device in dimension control unit 81, in addition to rheostat 38, includes a rectifier 144 having input terminals 145 and 146 and output terminals 147 and 148. A smoothing capacitor 149 is connected across the output terminals 147, 148 of the rectifier bridge.

The negative output terminal 148 of rectifier 144 is connected to both terminals 151 and 152 of rheostat 38 and to one terminal of the dynamic brake or control winding 104 of motor 91. Rheostat 38 is provided with an electrical center tap 153 that is connected to the positive terminal 147 of rectifier 144. The movable contact 154 of the rheostat, which is driven by shaft 37 (FIG. 1), is connected to the remaining terminal of brake winding 104.

The second dimension control unit 82 of system 20 is essentially identical in construction with unit 81. Thus, it comprises a direction control device, including switches 71 and 72, that selectively connects the field windings 133 and 135 of motor 92 to the AC supply. The control winding 134 of motor 92 is connected to the negative terminal of the rectifier bridge 156 and to the movable tap 157 of rheostat 57. Rheostat 57 has both of its end terminals connected to the negative terminal of rectifier 156 and has a center tap that is connected to the positive terminal of the rectifier.

Motor shafts 97 and 127 are mechanically connected in driving relationship to a controlled appaartus 161. As discussed above, apparatus 161 may constitute virtually any form of apparatus movable in first and second coordinate directions in response to actuation of the reversible electric motors 91 and 92.

In considering operation of control system 20, it may first be assumed that the main control member, handle 65, is disposed in precise vertical alignment, as shown in FIGS. 1–3. Under these circumstances, switches 41, 42, 71 and 72, are all open, as shown in FIG. 5. Only the brake windings 104 and 134 are energized. Consequently, motors 91 and 92 tend to resist any movement of the controlled apparatus 161. That is, any movement of the controlled apparatus tending to rotate shaft 97 induces an electromotive force in rotor 114, due to the movement of rotor 114 within the magnetic field of winding 104. Consequently, the dynamic brake afforded by winding 104 and rotor 114 tends to hold the controlled apparatus 161 in position. The same effect is produced by the dynamic brake of motor 92, comprising rotor 124 and winding 134.

If the operator now moves the main control member, handle 65, straight back from its initial position along the path 162 (FIG. 3), the pivotal member of the shaft also pivots saddle bracket 27 to the same extent and rotates the two shafts 28 and 29 upon which the saddle bracket is mounted. Crescent gear 35, through its connection to shaft 28, is pivoted, rotating gear 36 in a counterclockwise direction and imparting a corresponding rotational movement to rheostat shaft 37. As a consequence, the movable tap 154 of rheostat 38 (see FIG. 5) is deflected from its center or home position and reduces the DC current to the control or brake coil 104 of motor 91.

The pivotal movement of saddle bracket 27 also rotates shaft 29. As soon as shaft 29 is rotated, in this particular direction, cam surface 31 on cam 32 actuates cam follower arm 43 and closes switch 41. Closing of switch 41 energizes the shaded pole motor section comprising winding 103 and rotor 113, driving shaft 97 in a clockwise direction. The greater the movement of control member 65 along path 162 (FIG. 3), the greater the deflection of rheostat arm 154 along rheostat 38 (FIG. 5). That is, the more the operator moves the control stick toward the rear of the control apparatus, the greater the reduction in current to the brake winding 104 and the greater the speed of rotation of shaft 97. By moving the main control member, handle 65, to the limit of its arcuate movement, the operator can shift the movable contact 154 of the rheostat to the point where all resistance is removed in the rheostat circuit and the brake winding 104 is effectively de-energized. By reversing the movement of the handle from front to rear, the operator can reduce the speed of the motor. Return movement of the handle to its initial vertical home position opens switch 41 and restores full energization to brake winding 104, stopping motor 91 immediately at whatever position has been reached.

The action of dimension control unit 81 is similar for forward movement of handle 65 along the arcuate path 163 (FIG. 3). As soon as the control handle is moved forwardly from its vertical home position, switch 42 is closed, energizing coil 105 to drive the shaft 97 of motor 91 in a counterclockwise direction. Again, the speed of rotation of motor 91 is directly controlled in accordance with the amplitude of the pivotal movement of main control member 65, since this controls the position of the movable contact 154 of rheostat 38.

The operating effect of dimension control unit 82 is essentially identical to that of unit 81. Movement of control handle 65 to the left of center along path 164 (FIG. 1) rotates shaft 52 and causes cam surface 61 of cam member 60, mounted on that shaft, to actuate switch 71 to its closed position. Closing of switch 71 energizes the motor winding 133 (FIG. 5) and shaft 127 is driven in a clockwise direction. The speed of rotation is determined by the angular deflection of handle 164, which controls the movement of the movable contact 157 of rheostat 57. For maximum speed, the handle is moved to its extreme left position, shifting contact 157 to a point on the rheostat where there is no voltage applied to the brake winding 134 of motor 92. Again, movement of the handle back to its vertical home position restores movable contact 157 to the center of rheostat 57 and provides maximum current to the brake winding 134. At the same time, switch 71 is again opened so that motor shaft 127 is halted immediately.

Movement of main control member 65 to the right of its home position along path 165 in FIG. 1 controls counterclockwise rotation of motor 92. As soon as the handle is deflected along this path, switch 72 is closed to energize the counterclockwise motor winding 135. At the same itme, the current to brake winding 134 is reduced due to the movement of rheostat contact 157 in response to pivotal movement of the control handle. For rheostat 57, the requisite movement of the movable contact 157 is effected through the connection from handle 65 to shaft 52 and from shaft 52 through gears 54 and 55 to the rheostat shaft 56 (FIG. 3).

From the foregoing description, it will be apparent that the rotational speed of each of the motors 91 and 92 is determined directly by the amplitude of the pivotal movement of control member 65 from its vertical home position. The greater the extent of the pivotal movement, the higher the motor speed; conversely, the closer the main control member is to its center position, the slower the speed of the motor or motors that are energized. Control handle 65 can be moved to the left or right of center at the same time that it is pivoted either forwardly or backwardly. That is, the operator may move along any vector path to achieve a corresponding vectorial movement in controlled apparatus 161. Control system 20 thus provides a full control radius of 360° on the part of the main control member 65 and a corresponding movement for the controlled apparatus 161 and allows simultaneous directional and speed control of motors 91 and 92.

FIG. 6 illustrates an adaptation of control system 20 to use with a different form of motor. The motors 191 and 192 illustrated in FIG. 6 each comprise a three wire reversible variable speed motor.

Thus, motor 191 is a permanent split capacitor motor having a double winding, being similar in construction to a conventional reversible squirrel cage split phase induction motor except that it does not include a starting mechanism. The driving rotor of the motor is the rotor 213, which is disposed within the magnetic field of a dual split winding comprising winding sections 203A, 203B and 205A, 205B. Winding sections 203A and 203B are connected in series with each other as are sections 205A and 205B. Rotor 213 is mounted upon a shaft 197 which also carries an additional rotor 214. Rotor 214 is disposed within the magnetic field of a stator winding 204 and forms a magnetic brake therewith. A capacitor 206 is connected between the end terminals of winding sections 203B and 205B.

Motor 192 is similar in construction to motor 191. It includes a brake rotor 224 and a drive rotor 223 both mounted upon a shaft 227. The rotor 224 for the dynamic brake is again disposed within the magnetic field of a single stator winding 234.

The driving stator construction for motor 192 includes the series connected winding sections 233A and 233B and the series connected winding sections 235A and 235B. A capacitor 236 is permanently connected across the free ends of the stator windings 233B and 235B.

Dimension control unit 81 controls operation of motor 197 both with respect to the direction of rotation and the speed of rotation. Speed control is exercised through the dynamic brake comprising stator winding 204 and rotor 214. One terminal of winding 204 is connected to the negative terminal of the rectifier 144 and the other terminal of the winding is connected to the movable contact 154 of rheostat 38. Thus, the brake connections are the same as in FIG. 5.

The direction control device comprising switches 41 and 42 controls the direction of rotation of motor 191. Switch 41 connects the line terminal 142 to winding 203B, which is returned to the other line terminal 141 by means of a direct connection made to winding 203A. Similarly, switch 42 connects line terminal 142 directly to winding 205B whereas winding 205A is returned to terminal 141.

The connections for dimension control unit 82, actuating motor 192, are essentially similar to those for unit 81. The control of brake winding 234 of the motor is connected to the negative DC supply terminal and to the movable tap of rheostat 57 for speed control. Switch 71 is connected in the energizing circuit for stator windings 233A and 233B and switch 72 is connected in the energizing circuit for windings 235A and 235B. It will be understood that in control units 81 and 82 the DC connections can be reversed in polarity without affecting operation; this is equally true in all embodiments of the invention described hereinafter.

For motors 191 and 192, speed control is effected by increasing or reducing the viscous drag on the motor imposed by the individual dynamic brakes of the motors. With respect to motor 191, movement of the control handle 65 of the system toward and away from the operator imparts a corresponding movement to the movable contact 154 of rheostate 38. Maximum drag is achieved with the movable contact 154 in centered position as shown in FIG. 6, supplying the maximum voltage to winding 204. At the extreme of movement for the control handle either toward or away from the operator, the rheostat 38 is effectively shorted out and no voltage is applied to winding 204, permitting maximum operational speed for the motor. The same action is presented with respect to rheostat 57 controlling the brake 224, 234 of motor 192 in response to lift-right movement of the control handle.

As described above, movement of the control handle away from the operator closes switch 41. This energizes the operating windings of motor 191 to cause the motor to rotate its shaft 197 in a clockwise direction. Movement of the handle past the vertical position toward the operator, on the other hand, closes switch 42 and energizes the motor for counterclockwise rotation. Movement of the main control member of the system to the left closes switch 71 to energize the drive windings of motor 192 for clockwise rotation of the motor shaft 227. Movement of the control handle to the right from its vertical home position closes switch 72 and energizes motor 192 to rotate shaft 227 counterclockwise. As before, the motor shafts 197 and 227 are connected to the controlled apparatus 161 by suitable drive connections. The operator is not required to move the control handle parallel to the rotation axis of the handle; direct movement along any desired vector path energizes the motors proportionally and effects the desired vectorial movement on the part of controlled apparatus 161.

If should be noted that no internal changes are required in control system 20 when the control system is used in conjunction with motors 191 and 192. Rather, the control system remains the same as for motors 91 and 92; the only changes are in the external motor connections. By providing appropriate terminal boards or like connectors for direction control units 81 and 82, direct substitution of motors is possible without change of any of the operating units in the control system.

FIG. 7 illustrates a circuit 120 for application of the invention to the control of brush-type series wound motors. As shown therein, a motor 291 of this kind comprises a rotor 293 mounted on a shaft 297, the rotor being electrically connected to two brushes 294 and 295. A parallel RC circuit comprising a load resistor 286 and a capacitor 287 is connected across the brushes for the motor. The stator of the motor includes two field windings 298 and 299, having one common terminal 300 connected to the brush 295.

In the control system 120 illustrated in FIG. 7, there are some minor modifications of the first dimension control unit 281, which controls motor 291, as compared with the counterpart dimension control unit 81 in the previously described embodiments. However, the operating components are the same. Thus, dimension control unit 281 includes the rectifier bridge 144 connected to a suitable AC input and having positive and negative terminals 147 and 148 respectively. As before, a smoothing capacitor 149 is preferably connected across the output terminals of the bridge.

In this instance, both end terminals of the rheostat 38 are connected to the positive output terminal 147 of the rectifier. The movable contact 154 of rheostat 38 is connected to brush 294 of motor 291.

The movable contacts of each of the two cam-actuated switches 41 and 42 in the direction control device of dimension control unit 281 are both connected to the negative output terminal 148 of rectifier 144. The normally open fixed contact of switch 41 is connected to motor winding 298 and the normally open contact of switch 42 is similarly connected to motor winding 299.

Mechanical operation of control system 120 for varying the speed of direction of rotation of the modified series-wound split-field reversible brush-type motor 291 is the same as the mechanical operation of control system 20 for controlling the motors of the previously described embodiments. The electrical operation, however, is somewhat modified to meet the different motor requirements.

Thus, when the operator moves the control handle of system 120 directly away from himself, switch 41 closes, just as in the previously described embodiments. At the same time, movable contact 154 of rheostat 38 is moved off center to an extent determined by the amplitude of the pivotal movement of the control handle. This establishes a DC circuit from the positive terminal of bride 144 through rheostat 38 to brush 294 and from brush 295 through winding 298 and switch 41 back to the negative terminal of the DC supply. The farther the operator moves the handle away from him, the greater the reduction in effective resistance of rheostat 38 and the greater the voltage and current applied to motor 291. Thus, the speed of the motor increases in proportion of the angle through which the main control member is deflected.

Dynamic braking is effected, in the system shown in FIG. 7, when the main control member 65 of the system (FIGS. 1-3) is returned to its vertical home position and both of the switches 41 and 42 are open. The armature 293 of the motor (FIG. 7) tends to continue rotation because of its inertia. In so doing, the armature cuts through the residual magnetic field flux of the motor stator and generates an armature current for which the parallel RC circuit 286, 287 constitutes a load. That is circuit 286, 287 affords a dynamic braking load for the circuit and brings the rotational movement of the motor promptly to a halt when the main control member of the system is returned to its vertical home position.

Counterclockwise rotation of motor 291 is effected by the operator moving the main control handle toward himself, closing switch 42. The mode of operation, including dynamic braking, is the same as for clockwise rotation upon closing of switch 41. A second dimension control unit 282, corresponding in construction to unit 281, and including the second rheostat 57 and the additional cam actuated switches 71 and 72 described above, affords the second dimension control for the motor 292 in this system, motor 292 being similar in construction to motor 291. Again, the respective shafts 297 and 301 of motors 291 and 292 are appropriately connected to controlled apparatus 161 to drive that apparatus through the requisite coordinate movements imposed by the movement of the main control handle of the system.

FIG. 8 illustrates a further electrical modification of the control system of the present invention to accommodate yet another form of electric motor. The motor 391 shown in FIG. 8 is a shunt wound brush type motor comprising a rotor 394 mounted upon a shaft 397 and engaged by brushes 395 and 396. The shunt winding for the motor is indicated by reference numeral 393.

The first dimension control unit 381 for the control system 220 illustrated in FIG. 8 includes all of the components of unit 81 described above in connection with FIG. 5. In this circuit, the rectifier 144 is again connected to a suitable AC supply. The negative terminal 147 of the rectifier is coupled to both of the end terminals of rheostat 38. As before, capacitor 149 is connected across the output terminals 147 and 148 of the rectifier bridge.

The connections for the two cam-actuated switches 41 and 42 are different from those employed in previously described embodiments. Moreover, dimension control unit 381 includes two additional cam actuated switches 341 and 342. Switch 342 is controlled by an additional cam surface on the composite cam member 30 (FIG. 1), being actuated from engagement with its terminal 347 (FIG. 8) to close upon its terminal 348 whenever the main control member of the system is moved from its vertical home position toward either the front or the rear of the control mechanism. That is, switch 342 is actuated from the home position shown in FIG. 8 whenever handle 65 moves off center along either of the two arcuate paths 162 and 163 (FIG. 3).

Switch 341, on the other hand, is actuated from its normal engagement with its contact 343 only under the same conditions that cause actuation of switch 42. That is (forward movement of the control handle along the arcuate path 163 (FIG. 3) from the vertical home position disengages switch 341 from its contact 343 and closes the switch upon contact 344. Movement of the main control member away from the operator, beyond the vertical home position, does not actuate switch 341.

One terminal 401 of the field winding 393 for motor 391 is connected to terminal 343 of switch 341. The field winding terminal 401 is also connected to terminal 348 of switch 342. The movable contact of switch 341 is connected to the normally closed contact 345 of switch 41. The normally open contact 344 of switch 341 is connected to the positive terminal of rectifier 144.

The movable contact of switch 41 is connected to brush 395 of motor 391. The normally open contact 346 of this switch is connected to the movable contact 154 of rheostat 38. Contact 346 is also connected to the normally open contact 351 of switch 42. The movable contact of switch 42 is connected to brush 396 in motor 391. The normally closed contact 349 of this switch is connected to the positive terminal 148 of the DC supply 144.

In operation of control system 220, FIG. 8, it may first be assumed that the operator moves the main control member 65 of the mechanism toward the rear along path 162 (FIG. 3). The resulting rotational movement of saddle bracket shafts 28 and 29 rotates cam member 30 and actuates switches 41 and 342 from the position shown in FIG. 8 to the alternate positions for these switches. That is, switch 41 is closed upon its contact 346 and switch 342 closes upon its contact 348.

With switches 41 and 342 thus actuated, an operating circuit is established for motor 391. Beginning at the positive DC terminal 148, this circuit extends through the normally closed contact 349 of switch 42 to brush 396 and from brush 395 through switch 41 and its contact 346 to the movable contact 154 of rheostat 138 and back to the negative terminal 147 of the rectifier. The field winding 393 is energized through a circuit beginning at positive terminal 148 and extending through contact 348 of switch 342 back to the negative terminal of the rectifier. It is thus seen that the field winding 393 is placed in parallel with the armature of the motor and that both are energized, actuating the motor to rotate its shaft 397 in a clockwise direction and thus impart a corresponding movement to the controlled apparatus 161 to which the shaft is connected. It will be seen that, as in the previous embodiments, the amplitude of the pivotal movement of the main control member 65 determines the speed of motor operation; the farther off-center movable contact 154 is moved, as a result of corresponding movement on the part of the main control member, the greater the voltage applied to armature 394 and therefore the higher the operating speed of the motor.

When the operator returns the control handle to the vertical home position, dynamic braking is automatically achieved in the circuit of FIG. 8. The return of the main control member to its original position opens switch 342 and simultaneously returns switch 41 to its original position. The rotary inertia of armature 394 causes the armature to cut the residual magnetic field of the motor, initiating a circulating current through the field winding 393. This current, beginning at brush 395, flows through switches 41 and 341 to winding 393 and back through switch 42 to brush 396. Thus, dynamic braking is achieved, just as in the other embodiments of the invention.

Reverse operation of the main control member 65, pivoting the handle along path 163 (FIG. 1) actuates switches 42, 341 and 342; it will be recalled that switch 342 functions for both directions of movement, forward and rear, of the main control member. The resulting connections for field winding 393 are the same as before, terminal 401 being connected to the negative supply terminal 147 through switch 342 and terminal 402 being connected to the positive supply terminal 148. That is, the field connections are not changed. But the connections to brushes 395 and 396 for armature 394 are reverse in polarity. Thus, brush 396 is connected to the negative DC supply through switch 42 and through the movable contact 154 of rheostat 38, whereas brush 394 is connected through switch 41 (unactuated) and switch 341 to the positive DC terminal 148. Accordingly, motor 391 is now actuated for rotation in a counterclockwise direction, the amplitude of the pivotal movement of the control handle adjusting rheostat 38 to determine the speed of rotation of the motor.

In each of the several embodiments of the invention described above, only two-dimensional control is afforded. In each of the different circuit arrangements of FIGS. 5–8, however, it is clear that control in one dimension is independent of the control in the other. Thus, if the controlled apparatus is capable of movement in three different dimensions, it is a relatively simple matter to add an additional dimension control unit as indicated by the dimension control unit 481 in FIG. 5. The third dimension control unit actuates a third motor 491 that is connected to the controlled apparatus to drive the same in accordance with rotational movements of the main control member about a third axis.

With respect to the mechanical arrangement illustrated in FIGS. 1–3, the third direction of control movement for the main control member 65 can, for example, constitute rotational movement of the main control member about its longitudinal axis 482. It will be readily apparent that an additional speed control device comprising an appropriate rheostat can be connected to the main control member to be actuated by rotational movement of the handle about its longitudinal axis 482 and that the necessary direction control device comprising the switches 41 and 42 can be connected to the main control member in a manner similar to that illustrated for the two dimension control units 81 and 82. Of course, the orientation of the complete control system can be changed; the main control member 65 need not project vertically upwardly, but can be disposed in horizontal alignment when in its home position or in any other desired alignment.

In each of the embodiments described above, it is the rheostat that controls the rotational speed of the motor with which it is associated while the direction of motor rotation is controlled by the cam actuated switches. This functional arrangement for the dimension control units applies equally in all of the different specific control circuits illustrated in FIGS. 5–8.

From the foregoing description, it is seen that the control system of the invention permits the control of both the direction and speed of rotation of various different kinds of electric motors, from a single main control member, without requiring substantial modification of the basic control system for different motor types. In all embodiments of the invention, complete vector control is obtained and the operator can move the single main control member along any path to obtain a corresponding movement on the part of the controlled apparatus. Nevertheless, the control system is simple and inexpensive in construction and is reliable in operation.

We claim:

1. A control system for controlling an apparatus movable in first and second coordinate directions said system comprising:
    first and second reversible electric motors mechanically connectible to said apparatus to drive said apparatus in its first and second coordinate directions, respectively, each of said motors comprising two AC energized drive windings for driving the motor in opposed directions and each including dynamic brake means, comprising a separate DC energized dynamic brake winding, for arresting rotational movement of the motor;
    a main control member;
    mounting means for mounting said main control member for simultaneous rotational movement, from a given home position, about first and second transversely aligned axes;
    a first dimension control unit, electrically connected to said first motor, comprising a direction control device for controlling the direction of rotation of said first motor and a speed control device for continuously varying the speed of said first motor over a substantial speed range;
    a second dimension control unit, like the first control unit, electrically connected to said second motor to control the direction and speed of rotation thereof;
    means mechanically connecting the direction control device of each dimension control unit to said main control member to actuate said direction control device and energize the associated motor for rotation in a given direction in response to rotational movement of said main control member, from its home position, about one of said axes;

means mechanically connecting the speed control device of each dimension control unit to said main control member to actuate said speed control device and vary the speed of the associated motor continuously in accordance with variations in the amplitude of rotational movement of said main control member, from said home position, about the same axis;

and first and second brake control means, included in the speed control devices of said first dimension control units, respectively, for actuating the dynamic brake means of the associated motor to brake said motor whenever said main control member is returned to its home position, said brake control means each comprising a rheostat directly connected to the brake winding of its associated motor to provide maximum excitation of said brake winding whenever said rheostat is in centered position, with progressively decreasing excitation of said brake winding as said rheostat is moved from its centered position.

2. A control system for controlling an apparatus movable in first and second coordinate directions said system comprising:

first and second dual-brush series wound reversible electric motors, of the kind having two stator windings, mechanically connectible to said apparatus to drive said apparatus in its first and second coordinate directions, respectively, and each including dynamic brake means for arresting rotational movement of the motor;

a main control member;

mounting means for mounting said main control member for simultaneous rotational movement, from a given home position, about first and second transversely aligned axes;

a first dimension control unit, electrically connected to said first motor, comprising a direction control device for controlling the direction of rotation of said first motor and a speed control device for continuously varying the speed of said first motor over a substantial speed range;

each speed control comprising a rheostat connected in an energizing circuit between a power supply and the associated electrical motor, the rheostat being connected to one brush of the motor armature, the other brush being connected to both stator windings, said energizing circuit including two independent direction control switches through which said stator winding are returned to the power supply, said energizing circuit affording a given level of excitation to said motor whenever said rheostat is centered, the centered position for said rheostat corresponding to the home position for the main control member;

a second dimension control unit, like the first control unit, electrically connected to said second motor to control the direction and speed of rotation thereof;

means mechanically connecting the direction control device of each dimension control unit to said main control member to actuate said direction control device and energize the associated motor for rotation in a given direction in response to rotational movement of said main control member, from its home position, about one of said axes;

means mechanically connecting the speed control device of each dimension control unit to said main control member to actuate said speed control device and vary the speed of the associated motor continuously in accordance with variations in the amplitude of rotational movement of said main control member, from said home position, about the same axis;

and brake control means, comprising a dynamic braking load connected across said brushes, in each dimension control unit, for actuating the dynamic brake means of the associated motor to brake said motor whenever said main control member is returned to its home position.

3. A control system according to claim 1, in which said two drive windings in each motor are separate and independent, and in which each of said direction control devices comprises two electrical switches, each of which electrically connects only one of said drive windings to an AC power supply.

4. A control system according to claim 1, in which said motors are A.C. motors of the permanent split capacitor dual winding type, and in which said direction control devices each comprise two electrical switches individually connected between the two drive windings and an A.C. power supply to connect the drive windings to the supply in one phase relation in response to movement of said main control member in one direction from its home position and in opposed phase relation in response to movement of said main control member in the opposite direction from its home position.

References Cited
UNITED STATES PATENTS

| | | | |
|---|---|---|---|
| 2,362,650 | 11/1944 | Logan | 318—56 |
| 2,565,293 | 8/1951 | Aydelott et al. | 318—55 |
| 3,100,548 | 8/1963 | Ulinski | 318—54 |
| 3,100,860 | 8/1963 | Rosenthal | 318—55 |
| 3,303,403 | 2/1967 | Bonnano | 318—55 |

ORIS L. RADER, Primary Examiner

K. L. CROSSON, Assistant Examiner

U.S. Cl. X.R.

318—46, 57, 60